(12) United States Patent
Oostlander et al.

(10) Patent No.: US 8,285,841 B2
(45) Date of Patent: Oct. 9, 2012

(54) SERVICE QUALITY EVALUATOR HAVING ADAPTIVE EVALUATION CRITERIA

(75) Inventors: Bart Oostlander, Northville, MI (US); Bryce Dunn, Royal Oak, MI (US)

(73) Assignee: Compuware Corporation, Detroit, MI (US)

( * ) Notice: Subject to any disclaimer, the term of this patent is extended or adjusted under 35 U.S.C. 154(b) by 262 days.

(21) Appl. No.: 12/794,960

(22) Filed: Jun. 7, 2010

(65) Prior Publication Data
US 2011/0302294 A1 Dec. 8, 2011

(51) Int. Cl.
*G06F 15/173* (2006.01)
(52) U.S. Cl. .................. 709/224; 709/223
(58) Field of Classification Search .......... 709/223, 709/224
See application file for complete search history.

(56) References Cited

U.S. PATENT DOCUMENTS

| | | | | |
|---|---|---|---|---|
| 7,099,938 | B2 * | 8/2006 | Hermann et al. | 709/224 |
| 7,143,153 | B1 * | 11/2006 | Black et al. | 709/223 |
| 2007/0266148 | A1 * | 11/2007 | Ruiz et al. | 709/224 |

* cited by examiner

*Primary Examiner* — Krista Zele
*Assistant Examiner* — Andrew Georgandellis
(74) *Attorney, Agent, or Firm* — Harness, Dickey & Pierce, PLC (57) ABSTRACT

An improved method is provided for evaluating service quality of a software application residing in a computing environment. The method includes: monitoring first and second metrics indicative of performance of the software application; evaluating the first metric in relation to a first evaluation criterion; evaluating the second metric in relation to a second evaluation criterion different than the first evaluation criterion; and determining the state of service for the software application based in part on the evaluation of the second metric. Over time, the second evaluation criterion is adapted based on the outcome of the evaluation of the first metric.

8 Claims, 5 Drawing Sheets

| 0.0 | ≤ Value < | 20.0 | Normal |
|---|---|---|---|
| 20.0 | ≤ Value < | 80.0 | Warning |
| 80.0 | ≤ Value < | 100.0 | Down |

Name: [My Evaluation Directive]
Type: ○ Simple Directive
  ● Evaluate Other Directives and Use the [Worst ▽] — 62
  ○ Weighted Average Over Qualities Calculated by Other Directives Quality Evaluation Directives
| Directive |
|---|
| [My Evaluation Directive A ▽] — 61 |
| [My Evaluation Directive C ▽] — 61 |
| Add Directive |

Fig-6

Name: [My Evaluation Directive]
Type: ○ Simple Directive
  ○ Evaluate Other Directives and Use the [Worst ▽]
  ● Weighted Average Over Qualities Calculated by Other Directives     73     74

Directive Weights and Conditions
| Directive | Weight | Condition | | |
|---|---|---|---|---|
| [My Evaluation Directive A ▽] — 71 | [2 ▽] | [My Other Directive▽] | < | [Down ▽] |
|  | [5 ▽] | Otherwise | | |
| [My Evaluation Directive C ▽] — 71 | [5 ▽] | [My Other Directive▽] | < | [Down ▽] |
|  | [0 ▽] | Otherwise | | |
| Add Directive | | | | |

SERVICE QUALITY EVALUATOR HAVING ADAPTIVE EVALUATION CRITERIA

FIELD

The present disclosure relates to improved techniques for evaluating service quality of a software application using adaptive evaluation criteria.

BACKGROUND

Current trends in information technology show that the vast majority of companies are moving to distributed service-oriented architectures having software services deployed across their computing infrastructure. The success of such deployments is determined in part by how the services affect the quality and performance of the mission-critical applications with which they interface. As such, it is critical to understand the service quality of these services as well as the applications they support.

Determining the service quality of a software application is seldom as straightforward as a simple evaluation of a metric value against a baseline or threshold. Rather, the service quality of an application may depend on various contextual considerations instead of any one specific metric. Therefore, it is desirable to develop improved techniques for evaluating service quality of applications residing in a distributed computing environment.

This section provides background information related to the present disclosure which is not necessarily prior art.

SUMMARY

An improved method is provided for evaluating service quality of a software application residing in a computing environment. The method includes: monitoring first and second metrics indicative of performance of the software application; evaluating the first metric in relation to a first evaluation criterion; evaluating the second metric in relation to a second evaluation criterion different than the first evaluation criterion; and determining the state of service for the software application based in part on the evaluation of the second metric. The second evaluation criterion is adapted based on the outcome of the evaluation of the first metric. There is no limit on the number of evaluation criteria, which other evaluation criteria they affect, and whether or not they contribute to the calculation of service quality in and of themselves as well.

A more robust method for evaluating service quality of a software application is also contemplated. The method includes: monitoring a weighting metric indicative of performance of the software application and evaluating the weighting metric in relation to an evaluation criterion. The state of service for the software application is evaluated in accordance with a first evaluation directive and a second evaluation directive. The state of service evaluated in accordance with the first evaluation directive is weighted by a first weighting factor and the state of service evaluated in accordance with the second evaluation directive is weighted by a second weighting factor. A state of service outcome for the software application is then assigned by aggregating the weighted state of service determined in accordance with the first evaluation directive with the weighted state of service determined in accordance with the second evaluation directive. The first or second weighting factors are adapted based on the outcome of the evaluation of the weighting metric in the sense that each weighting factor is in itself a function of the outcome of any number of other evaluation criteria.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Figure 1:
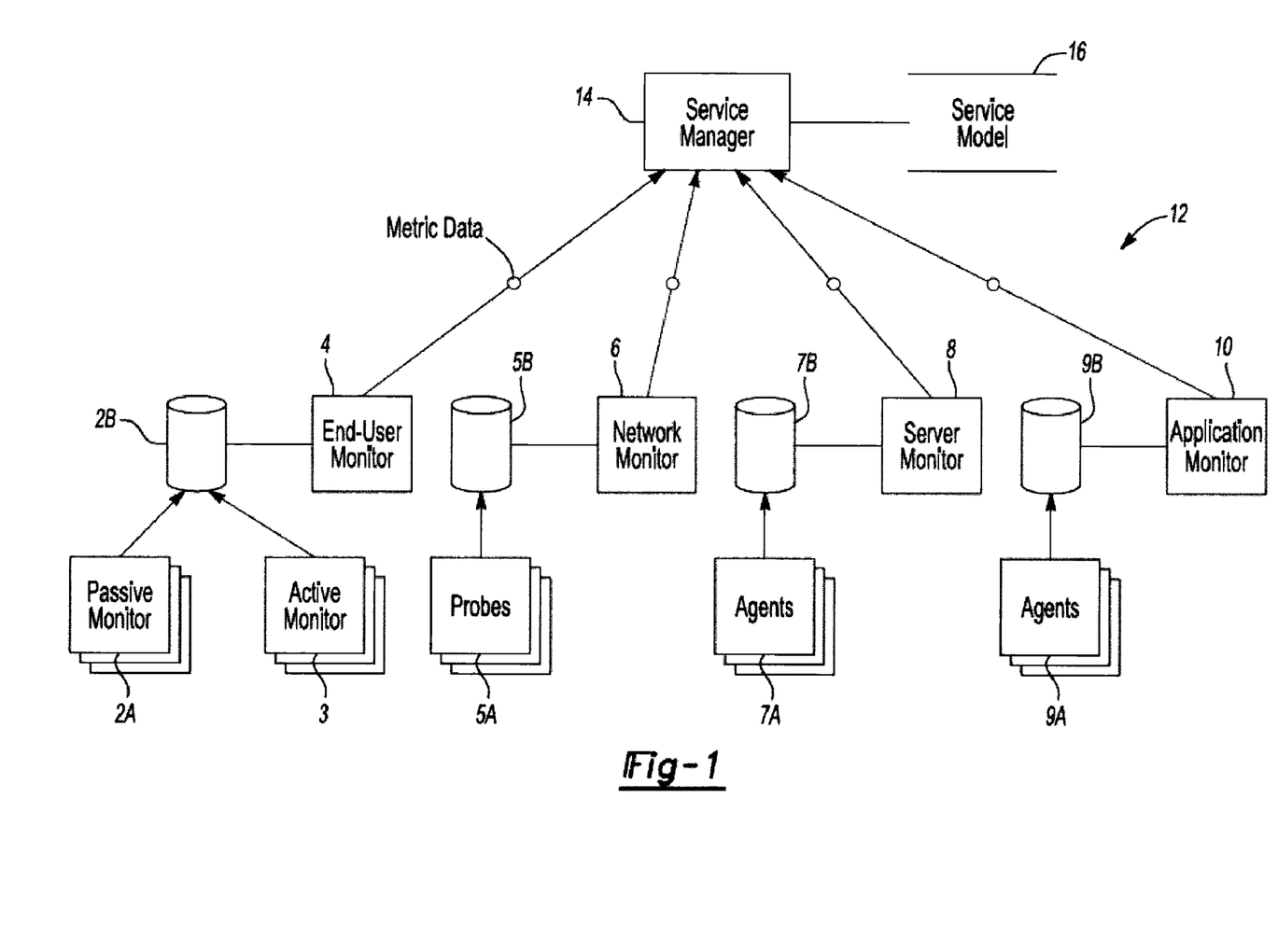
FIG. 1 is a diagram depicting an exemplary performance monitoring tool.

FIG. 1 depicts an exemplary performance management tool 12 that monitors performance of software applications in a computing environment. The performance management tool is comprised generally of a service manager 14, a service model 16, and a plurality of different monitoring tools 18. The performance management tool 12 may include other components. The VANTAGE software product commercially available from Compuware Corporation is an exemplary performance management tool. While the following description is provided with reference to the VANTAGE software product and accompanying software offerings, it is readily understood that the teachings of this disclosure are applicable to other performance management tools, such as FOGLIGHT tool from Quest Software and ITCAM tool from IBM. Moreover, it is understood that the VANTAGE software product may be interfaced with monitoring tools from other third party vendors, and metrics provided by such tools can be readily integrated into the described method for the calculation of state of service of any particular entity.

The service manager 14 processes and distills data from disparate sources to present a real-time (or near real-time) view of service quality and performance of software applications which comprise an enterprise's computing environment. The service manager 14 relies upon a service model 16 residing in a data store to understand the relationship between the data and a given application. More specifically, the service model 16 is a data structure that maps each software application in the computing environment to the respective computing infrastructure that supports the software application. The service manager 14 may use a dashboard concept to present service quality and performance indicators on a graphical user interface for each of the applications being monitored. Performance data may be gathered using different types of monitoring tools 18 as will be further described below.

End-user monitoring may be accomplished using one of two methods. Agentless monitoring measures application response times experienced by each user of an application as well as other related performance metrics. In this approach, monitoring software 2A passively (i.e. in an agentless fashion) collects data anywhere in the network from one or more centralized locations. In other words, the monitoring software does not reside on the end-users computing device. The monitoring software 2A in turn stores the collected data in a database 2B associated with the tool. Such end-user monitoring software is available with the VANTAGE product offering.

Active monitoring (i.e. synthetic) gauges response times for applications using monitoring software that typically resides on the end-users computing device or a dedicated workstation. The monitoring software 3 simulates user experiences using synthetic transactions, thereby providing "control" measurements that are especially important for assuring performance when actual usage is low. Likewise, the collected data may be stored in database 2B for subsequent reporting and analysis. The ClientVANTAGE software available with the VANTAGE product offering is an example of this type of monitoring tool.

Network monitoring tools monitor traffic on an enterprise's network. Network probes 5A are placed at different locations in the network. Each probe is a software component that passively collects data which may be used to derive performance metrics such as network throughput, bandwidth utilization, total bytes sent, server response time, etc. Other network performance related metrics are also contemplated by this disclosure. The collected data is then stored in a database 5B. The network monitoring tool may further include a software analysis component 6 that analyzes and compiles the data for subsequent reporting. The NetworkVANTAGE software available with the VANTAGE product offering is an example of this type of monitoring tool.

Server monitoring tools monitor metrics for physical or virtualized server machines. Software agents 7A are placed on each of the devices being monitored. The software agents 7A collect data which may be used to derive performance metrics such as CPU utilization, memory utilization, disk space availability and other server related performance metrics. The collected data is then stored in a database 7B. The server monitoring tool may further include a software analysis component 8 that analyzes and compiles the data for subsequent reporting. The ServerVANTAGE software available with the VANTAGE product offering is an example of this type of monitoring tool. Microsoft's Operations Manager is a comparable server monitoring tool.

Application performance monitoring tools monitor the performance and service availability of software applications running on physical or virtualized servers. Software agents 9A are placed on the servers that host the software applications. The software agents 9A collect data which may be used to derive performance metrics including CPU utilization by an application, memory utilization by an application or other application related performance metrics. The collected data is then stored in a database 9B. The application performance monitoring tool may further include a software analysis component 10 that analyzes and compiles the data for subsequent reporting. The VANTAGEAnalyzer software available with the VANTAGE product offering is an example of this type of monitoring tool. Computer Associates' Wily Customer Experience Manager is a comparable application performance monitoring tool.

Figure 2:
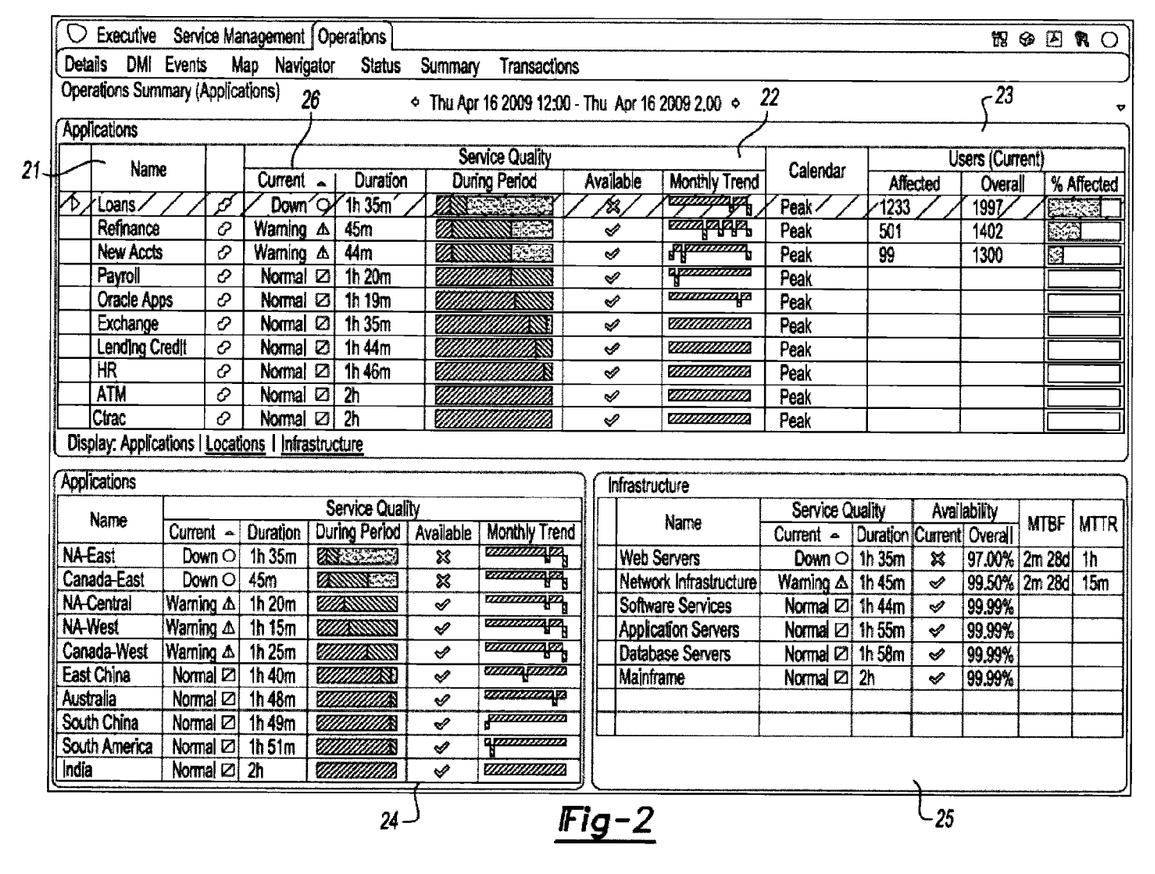
FIG. 2 depicts an exemplary operations overview interface from a performance management tool.

FIG. 2 depicts an exemplary operations overview interface 20 from a performance management tool. In this example, the operations overview interface 20 presents service quality and performance indicators in real-time for each of the applications being monitored by the user. The names of the applications 21, along with various performance indicators 22, are listed in the top panel 23 of the interface. Additional panels may be used to present service quality indicators for different geographic locations 24 and/or different types of computing infrastructure 25.

One of the service quality indicators is the current state of service 26 provided by the application. Applications that are not currently experiencing any problems may have a normal state of service, such as the payroll application. When an application experiences a performance problem, the current state of service indicator will change states. For example, the current state of service indicator may indicate a warning condition as in the case of the refinance application or a non-operational (or down) condition as in the case of the loans application. Presented with this type of information, users can initiate an investigation into the source of a problem.

Available categories for the state of service is a user configurable parameter. In an exemplary embodiment, the current state of service is selected from a group comprised of: good, normal, warning and critical (may also be referred to as non-operational or down). Each of these states is also assigned a numeric value. For example, a good state has a value of 4, a normal state has a value of 3, a warning state has a value of 2 and a critical state has a value of 1. Values assigned to each state may be used to aggregate multiple states of service as will be further described below.

Figure 3:
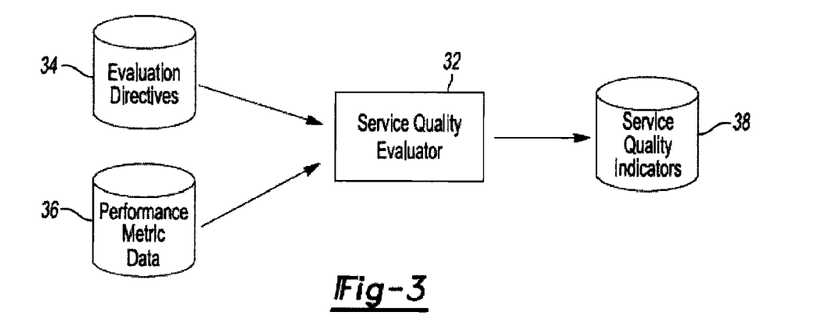
FIG. 3 is a diagram of a service quality evaluator in the context of a performance management tool.

Within the context of the service manager, a service quality evaluator 32 functions to evaluate service quality of an application as shown in FIG. 3. The service quality evaluator 32 determines a current state of service provided by an application by executing an evaluation directive. In a simplified example, the evaluation directive evaluates a metric indicative of performance of the software application in relation to an evaluation criterion to determine the current state of service. Performance metric data 36 and evaluation directives 34 reside in a periodically updated data store accessible to the service quality evaluator 32. In an exemplary embodiment, the performance metric data is continuously gathered and periodically stored using the monitoring tools described above; whereas, evaluation directives are user defined rule sets as further described below. The current state of service, along with any other service quality indicators, determined by the service quality evaluator is stored in another data store 38 for subsequent reporting. In one exemplary embodiment, the service quality evaluator 32 is implemented as one or more software modules (i.e., computer executable instructions) which reside in a computer memory and are executed by a computer processor. The service quality evaluator may also be implemented using application specific integrated circuits (ASIC), an electronic circuit, a combinational logic circuit, and/or other suitable components that provide the described functionality.

Figure 4:
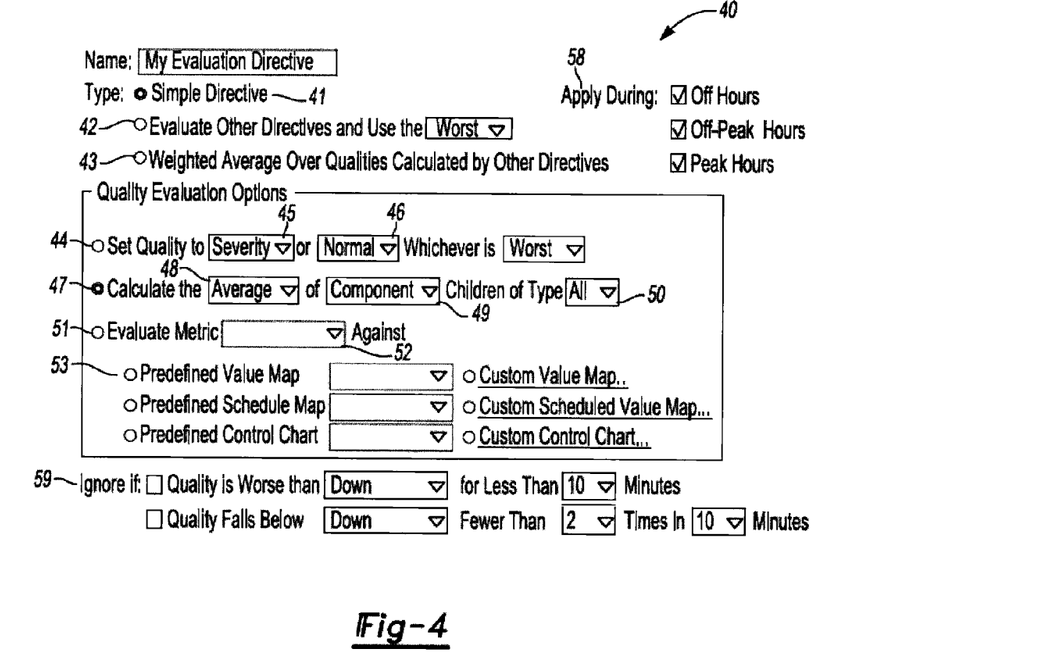
FIG. 4 depicts an exemplary user interface which may be used to define a simple evaluation directive.

Different types of evaluation directives may be executed by the service quality evaluator 32 when evaluating state of service as indicated at 47. These different types of evaluation directives are configured using a graphical user interface 40 exposed by the service quality evaluator. In an exemplary embodiment, a user may select from amongst a simple evaluation directive 41, an aggregated evaluation directive 42 or a conditionally weighted aggregation evaluation directive 43 as shown in FIG. 4. Each of these evaluation directives is further described below. It is envisioned that other types of evaluation directives are also within the scope of this application.

With continued reference to FIG. 4, different evaluation options are available when defining a simple evaluation directive (i.e., criterion). First, the state of service for an application may be set at 44 in accordance with an input from an external evaluator, such as a particular monitoring tool. For example, a server monitoring tool may autonomously determine a state of service for a given server and this state of service from the server monitoring tool may be used to set the state of service for an application running on the given server. The state of service for the application may also be selected from the input from the external evaluator (indicated at 45) or a minimum state 46 (selected by the user) whichever is best or worst. Inputs from other types of external evaluator are also contemplated by this disclosure.

Second, the state of service for an application may be based on the state of service of dependent services. For example, the state of service for an application may be based on the service states for a collection of servers which comprise a server farm or server cluster. The state of service for the application is determined by aggregating the services state associated with each of the servers in the server cluster. The aggregation method is specified at 48 and the dependent services are specified at 49. Different ways for aggregating the service states are contemplated by this disclosure. In one embodiment, the state of service for the application is set to an average of the service states, where the server cluster is comprised of three servers having service states of normal (value=3), warning (value=2) and down (value=1), respectively. In this example, the average of the service states is 2 (i.e., (3+2+1)/3) and thus the state of service for the application is set to a warning state. In another embodiment, the state of service is set to the worst service state amongst the three servers. In this example, the worst service state among the three servers is non-operational and thus the state of service for the application is set to a non-operational state. Other non-limiting ways of aggregating the service states include best, optimistic average (i.e., average rounded up), or pessimistic average (i.e., average rounded down). The state of service for the application may also be based on a subset of dependent services, where the type of services included in the subset is further specified at 50 by the user.

Figure 5:
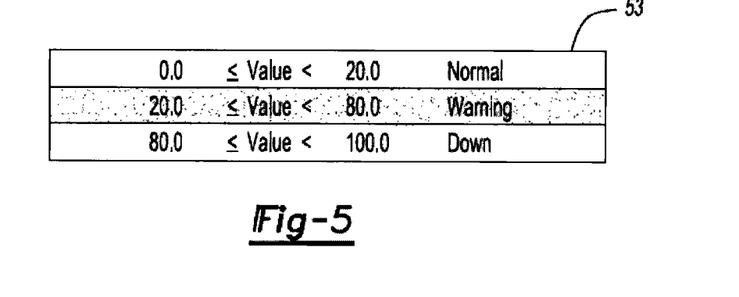
FIG. 5 illustrates an exemplary default value map.

Third, the state of service for an application may be based on an evaluation of a performance metric in relation to an evaluation criterion as indicated at 51. In one embodiment, a selected metric 52 is evaluated against a value map 53. A value map defines ranges of values for the metric along with an associated state of service for each range. FIG. 5 illustrates an exemplary default value map for a metric reported as a percentage, such as percentage of slow transactions. A user may select from one or more predefined value maps or create a custom value map for a given metric. In place of absolute thresholds, it is noted that value maps can contain deviation thresholds (i.e., % distance from applicable baseline values collected over time).

Independent of which type of simple evaluation directive is defined, a user may further specify at 58 when to apply the directive. For example, a user may elect to apply the directive during peak hours (e.g., 8 am-5 pm) and off-peak hours (e.g., 6 am-8 am and 5 pm-10 pm) but not during off hours (e.g., 10 pm-6 am). Alternatively, the user may elect to apply the directive only during peak hours. As a default condition, the simple evaluation directive may be applied at all times if the user does not specify when to apply the directive.

To account for statistical anomalies or temporary exception conditions, a user may also define grace conditions as indicated at 59. A grace condition enables the user to ignore the outcome of the evaluation directive if it yields a quality less than a given level consistently over a given timeframe and/or fewer than a distinct number of times during a given timeframe. For example, ignore a current state of service of down when this current state persisted for less than ten minutes. Other types of grace conditions are also contemplated by this disclosure.

Figure 6:
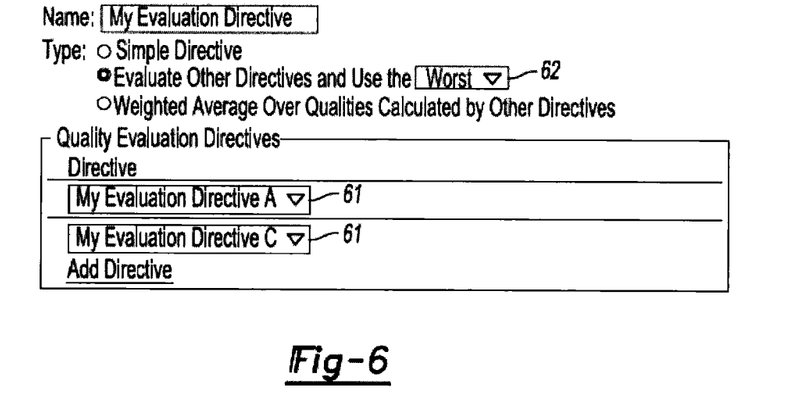
FIG. 6 depicts an exemplary user interface which may be used to define an aggregated evaluation directive.

An aggregated evaluation directive may be formed from two or more evaluation directives of any type as shown in FIG. 6. In a simple aggregation directive, the state of service outcome for the directive is based on the state of service outcome of two or more other evaluation directives 61, such as 'My Eval Directive A' and 'My Eval Directive C'. The evaluation directives used to construct an aggregated directive may be of any type, including another aggregated evaluation directive or a conditionally weighted aggregation as further described below. The rule for aggregating the simple directives is also specified at 62 by the user. In an exemplary embodiment, the aggregation rule may set the state of service outcome to the best, worst, average, optimistic average or pessimistic average of the service state outcomes of the specified evaluation directives. Other rules for aggregating the service state outcomes are also contemplated by this disclosure.

Figure 7:
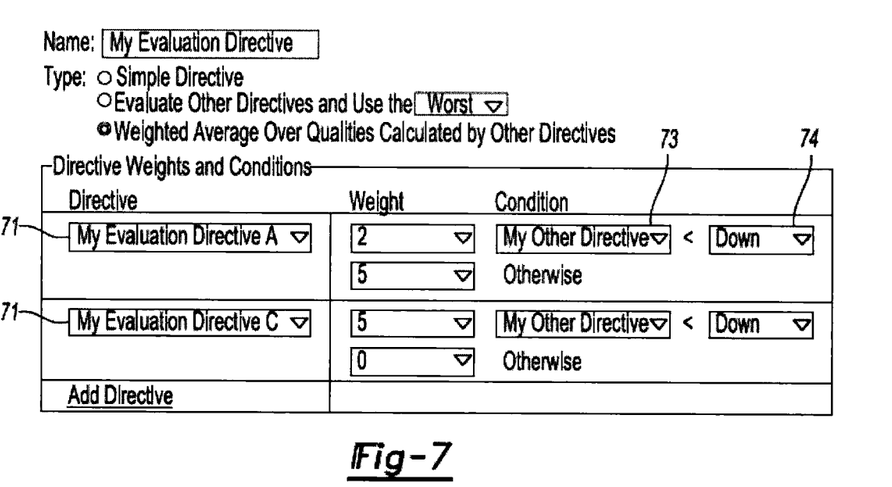
FIG. 7 depicts an exemplary user interface which may be used to define a conditionally weighted aggregated evaluation directive.

FIG. 7 illustrates how a user may define a conditionally weighted aggregation of evaluation directives. In the conditionally weighted aggregation, the state of service outcome for the directive is again based on the state of service outcome of two or more other evaluation directives 71, such as 'My Eval Directive A' and 'My Eval Directive C'. In this exemplary embodiment, the outcome for the directive is a weighted average of the service state outcomes of the specified evaluation directives. To illustrate this aggregation technique, assume 'My Eval Directive A' directive has a state of service outcome with a value of 3 and an applied weighting of 2 and 'My Eval Directive C' has a state of service outcome with a value of 2 and an applied weighting of 5. In this case, the weighted average for 'My Evaluation Directive' directive is computed as follows: ((3×2)+(2×5))/7, thereby yielding a weighted average of 2.2 and a state of service outcome of warning for the 'My Evaluation Directive' directive. Other types of rules for aggregating the service state outcomes are again contemplated by this disclosure.

Specified weightings associated with each of the specified evaluation directives may be conditionally applied based on any number of other conditions. In a simplified embodiment, the condition may evaluate a performance metric (also referred to herein as the weighting metric) in relation to a single evaluation criterion. For example, the performance metric may be the number of current users of the application. When the number of current users exceeds a threshold, the weighting is set to 5; otherwise, the weighting is set to 2. The applicable weighting is then applied to the outcome of the specified directive, such as My Eval Direction A in FIG. 7. Consequently, as the number of current users of the application changes over time, the weighting applied to the specified directive is adapted accordingly. The conditional selection of alternative rules can be specified by setting the weight to zero for the appropriate condition. Instead of an integer, the weighting factor may be expressed as a percentage (e.g., condition A is weighted 75% and condition B is weighted 25%). Other weighting schemes also fall within the scope of this disclosure.

Figures 8, 9:
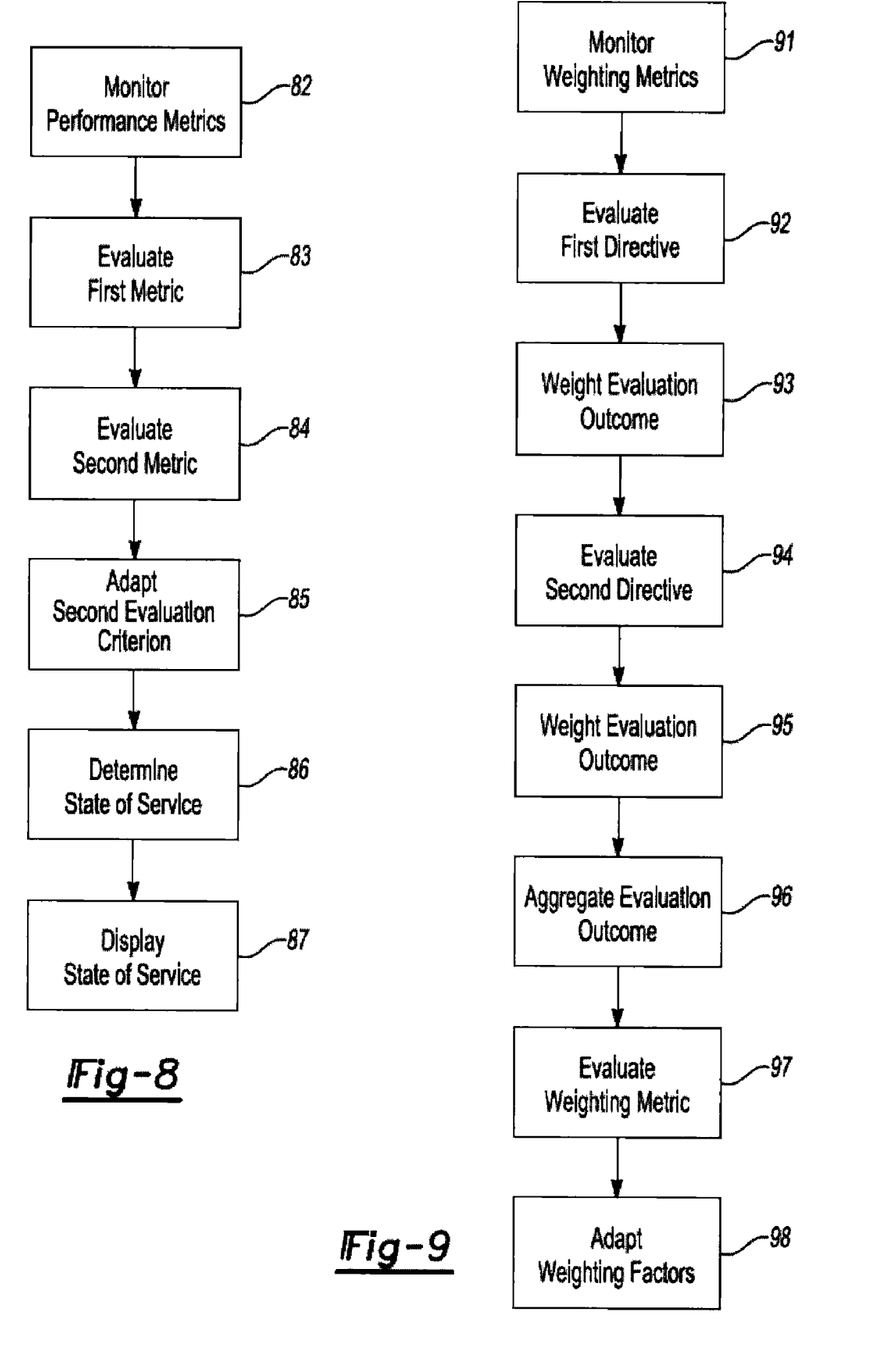
FIG. 8 is a flowchart illustrating an exemplary method for evaluating service quality of a software application.
FIG. 9 is a flowchart illustrating another exemplary method for evaluating service quality of a software application.

This method for evaluating service quality of a software application can be characterized generally as shown in FIG. 8. Two metrics indicative of performance of the software application are monitored at 82 by a service quality evaluator. The first metric is evaluated at 83 in relation to first evaluation criterion; whereas, the second metric is evaluated at 84 in relation to a second evaluation criterion, where the first evaluation criterion is different than the second evaluation criteria. Of note, the second evaluation criterion is adapted 85 over time based on the outcome of the evaluation of the first metric. In the example described above, the weighting factor of the evaluation criterion is changed based on the outcome of 'My Other Dir' directive. By conditionally selecting different directives, the thresholds against which the second metric are evaluated may also be changed based on the outcome of the 'My Other Dir' directive. In any case, the state of service for the software application is determined at 86 based in part on the evaluation of the second metric. An indicator for the state of service may optionally be displayed at 87 on a display device.

In a more robust embodiment, each condition is expressed as another directive evaluated against a threshold as shown in FIG. 7. For example, the state of service outcome for 'My Other Dir' directive 73 is compared to a state of service as specified at 74 by the user. In this example, the threshold is selected as 'Down' or non-operational. When the state of service outcome for 'My Other Dir' directive is less than non-operational, then a weighting of 2 is applied to the outcome of My Eval Direction A directive. When the state of service outcome for 'My Other Dir' directive is greater than or equal to non-operational, then a weighting of 5 is applied to the outcome of My Eval Direction A directive. It is envisioned that the user may designate another types of operators including but not limited to less than or equal to, greater than, greater than or equal to, or equal to.

While only two conditions are shown for each directive, it is readily understood that more or less conditions may be defined for a given directive. Moreover, weighting may be triggered by satisfying a compound condition (i.e., a series of conditions). It is also envisioned that the user may create complex expressions using various operators (AND/OR/NOT) to designate the appropriate condition for a given weighting. Exemplary compound conditions may include: condition A or condition B or condition C; condition A and condition B; as well as condition A but not condition B. Other types of compound conditions are also contemplated by this disclosure.

This more robust method for evaluating service quality of a software application can be characterized generally as shown in FIG. 9. A weighting metric indicative of performance of the software application is monitored at 91. A state of service for the software application is evaluated at 92, 94 in accordance with a first evaluation directive and a second evaluation directive different than the first evaluation directive. The state of service determined in accordance with the first evaluation directive is weighted at 93 by a first weighting factor and the state of service determined in accordance with the second evaluation directive is weighted at 95 by a second weighting factor. A state of service outcome for the software application is then assigned by aggregating 96 the weighted state of service determined in accordance with the first evaluation directive with the weighted state of service determined in accordance with the second evaluation directive. The weighting metric is evaluated at 97 in relation to an evaluation criterion. Over time, the first or second weighting factors are adapted 98 based on the outcome of the evaluation of the weighting metric.

For illustrations purposes, an example of a conditionally weighted aggregation of evaluation directive is set forth below. In this example, the software application being evaluated processes order submission transactions and therefore the evaluation directive is entitled the 'Submit Order' directive. The state of service outcome for the Submit Order directive is based on three other directives as follows:

Weighted average of qualities calculated by the following criteria:
   Synthetic Performance with weight of:
      7 if Number of Users falls below Normal
      3 if Number of Users is Normal
      1 otherwise
   Real User Performance with weight of:
      2 if Number of Users falls below Normal
      8 otherwise
   CRITICAL with weight of
      100 if Number of Users is Critical
      0 otherwise Supporting rules and other criterion that help to define the Submit Order directive are as follows:
The Service Quality of the Number of Users criterion uses:
Metric NoOfCurrentUsers against:
   PeakExpectedUsers thresholds during Peak hours
   NormalExpectedUsers thresholds during Off-Peak hours
   DowntimeExpectedUsers thresholds during Non-Business hours
The PeakExpectedUsers thresholds are:

| | | |
|---|---|---|
| From 0 | to 50: | Critical |
| From 50 | to 1,000: | Warning |
| From 1,000 | to 10,000: | Normal |
| From 10,000 | to Infinity: | Good |

The NormalExpectedUsers thresholds are:

| | | |
|---|---|---|
| From 0 | to 5: | Critical |
| From 5 | to 500: | Warning |
| From 500 | to 5,000: | Normal |
| From 5,000 | to Infinity: | Good |

The DowntimeExpectedUsers thresholds are:

| | | |
|---|---|---|
| From 0 | to 50: | Warning |
| From 50 | to 500: | Normal |
| From 500 | to Infinity: | Good |

The Synthetic Performance criterion uses:
Worst of qualities calculated by the following criteria:
   Synthetic Backbone Performance during Peak hours and Off-Peak hours
   Synthetic Active Performance during Off-Peak hours and Non-Business hours
The Synthetic Backbone Performance criterion uses:
Optimistic Average of qualities calculated by the following criteria:
   Service Quality of children of type Backbone Metrics The Synthetic Active Performance criterion uses:
Average of metric TransactionTime from children of type
  Active Monitoring against:
    LowTransTime thresholds if Number of Users falls
      below Normal
    NormalTransTime thresholds otherwise
The Real User Performance criterion uses:
Average across the children of metric TransactionTime
  from children of type Real User Monitoring against:
    TransTimeMinimum thresholds during Off-Peak hours
      and Non-Business hours
    TransTimeDeviation chart criteria during other hours
The TransTimeMinimum thresholds are:

| From 0 | to 0.5 secs: | Normal |
| From 0.5 | to 1.5 secs: | Warning |
| From 1.5 | to Infinity: | Critical |

The TransTimeDeviation chart criteria are:

| If 3 times in 10 mins outside 1 sigma: | Warning |
| If 10 times in 10 mins within 1 sigma: | Warning |
| If 1 time any time outside 2 sigma: | Critical |
| Otherwise: | Normal |

Within the context of the exemplary framework described above, the Submit Order directive illustrates how directives may be defined and nested to form a conditionally weighted aggregation of evaluation directive. This example is in no way limiting of how directives can be constructed.

Another unique aspect of this disclosure is a shift in paradigm to evaluate service quality of an application from the perspective of the end user experience. Certain evaluation directives are particularly suited to evaluating the end user experience. For example, what is the response time of an application as experienced by an end user? An exemplary listing of such evaluation directives includes: real response time, real response time against expected user levels, synthetic response time, slow transactions, current users, impacted users, abnormal errors and abnormal aborts. Definitions and templates for each of these evaluation directives are provided below.

Furthermore, certain metrics are more or less applicable depending on the context. For example, metrics relating to actual usage of an application by end users can be skewed during low usage periods, such as off hours. Conversely, metrics generated from synthetic transactions can serve as a control mechanism during the low usage periods. To address different contexts, evaluation directives are formed by combining metrics based on actual and synthetic application performance. Examplary directives may include combining real and synthetic response time metrics or combining synthetic response time and number of impacts users. Definitions and templates for each of these evaluation directives are also provided below.

Real Response Time:
  Description: Yields a quality rating using the real transaction time against a value map.
  Calculation: Use performance metric indicative of actual transaction time for the application of interest over a sequence of operations as measured from actual end-user interactions and a user defined value map.

| Quality Rating | Conditions |
| --- | --- |
| Use (Value Map) | No conditions apply (default). |

Real Response Time Against Expected User Levels:
  Description: Yields a quality rating using a value map if the number of affected users is larger than a given threshold value. The real transaction times are evaluated against the value map. When the number of current users falls below a given threshold, this rule yields a quality rating of "WARNING". When the number of current users falls below an even lower threshold, this rule yields a quality rating of "BAD".
  Calculation: Use performance metric indicative of actual transaction time for the application of interest over a sequence of operations as measured from actual end-user interactions and a user defined value map. Condition threshold values are also user defined.

| Quality Rating | Conditions |
| --- | --- |
| Use (Value Map) | # CurrentUsers > 90 |
| Set to WARNING | # CurrentUsers < 90 |
| Set to BAD | # CurrentUsers < 70 |
| Not available | No conditions apply (default). |

Synthetic Response Time:
  Description: Yields a quality rating based on a scripted continuous replay of the steps involved in the transaction in relation to a value map; a template for the value map includes a targeted response time threshold and an unacceptable response time threshold.
  Calculation: Use performance metric derived from synthetic transactions with the application of interest.

| Quality Rating | Conditions |
| --- | --- |
| Use (Value Map) | No conditions apply (default). |

In one embodiment, a default value map shown below is provided for customization by user. In another embodiment, the value map for this rule will be dynamically constructed based on threshold values embedded in the monitoring data provided by the software component that collects this metric. In other words, the two threshold are provided by the applicable monitoring tool.

| −Infinity ≤ Value < 0.0 | Unknown |
| 0.0 ≤ Value < [PerfThreshold] | Normal |
| [PerfThreshold] ≤ Value < [GiveupThreshold] | Warning |
| [GiveupThreshold] ≤ Value ≤ Infinity | Down |

Slow Transactions:
  Description: Yields a quality rating based on an evaluation of percentage of slow transactions against a threshold.
  Calculation: Use performance metric indicating a percentage of slow transactions for the application of interest.

| Quality Rating | Conditions |
|---|---|
| Use (Value Map) | No conditions apply (default). |

Default value map is provided for customization by user:

| | |
|---|---|
| 0.0 ≤ Value < 20.0 | Normal |
| 20.0 ≤ Value < 80.0 | Warning |
| 80.0 ≤ Value ≤ 100.0 | Down |

Current Users:

Description: Yields a quality rating based on an evaluation of the number of active users against a value map.

Calculation: Use performance metric indicative of current number of users for the application of interest and a user defined value map.

| Quality Rating | Conditions |
|---|---|
| Use (Value Map) | No conditions apply (default). |

Impacted Users:

Description: Yields a quality rating based on an evaluation of the number of impacted users against a value map.

Calculation: Use performance metric indicative of the number of impacted users for the application of interest and a user defined value map.

| Quality Rating | Conditions |
|---|---|
| Use (Value Map) | No conditions apply (default). |

Abnormal Errors:

Description: Yields a quality rating based on an evaluation of the number timeouts during scripted replay of the transaction against a value map.

Calculation: Use performance metric indicative of the number of timeouts encountered by the application of interest and a user defined value map.

| Quality Rating | Conditions |
|---|---|
| Use (Value Map) | No conditions apply (default). |

Abnormal Aborts:

Description: Yields a quality rating based on the number of interrupted transactions due to unexpected user navigations.

Calculation: Use performance metric indicative of the number of interrupted transactions encountered by the application of interest and a user defined value map.

| Quality Rating | Conditions |
|---|---|
| Use (Value Map) | No conditions apply (default). |

Combined Real and Synthetic Response Time:

Description: Yields a quality rating based on an evaluation of real response time, synthetic response time and expected user levels. Depending on the number of current users, either the real response time or the synthetic response time will carry more weight in determining the quality rating.

Calculation: Weighted average over rules

| Rule | Apply During | Weight | When |
|---|---|---|---|
| ☑ Real Response Time | ☑ Off hours<br>☐ Off-peak hours<br>☐ Peak hours | 75%<br>25% | # CurrentUsers > 80<br># CurrentUsers < 80 |
| ☑ Real Response Time against Expected User Levels | ☐ Off hours<br>☑ Off-peak hours<br>☑ Peak hours | 75%<br>25% | # CurrentUsers > 80<br># CurrentUsers < 80 |
| ☑ Synthetic Response Time | ☑ Off hours<br>☑ Off-peak hours<br>☑ Peak hours | 25%<br>75% | # CurrentUsers > 80<br># CurrentUsers < 80 |

Combined Slow Transactions and Synthetic Response Time:

Description: Yields a quality rating based on an evaluation of the percentage of slow transactions, expected user levels and synthetic response time. Depending on the number of current users, either the percentage of slow Transactions or the synthetic response time will carry more weight in determining the quality rating.

Calculation: Weighted average over rules

| Rule | Apply During | Weight | When |
|---|---|---|---|
| ☑ Slow Transactions | ☑ Off hours<br>☑ Off-peak hours<br>☑ Peak hours | 75%<br>25% | # CurrentUsers > 80<br># CurrentUsers < 80 |
| ☑ Synthetic Response Time | ☑ Off hours<br>☑ Off-peak hours<br>☑ Peak hours | 25%<br>75% | # CurrentUsers > 80<br># CurrentUsers < 80 |

The templates for these evaluation directives can be preconfigured in the service quality evaluator and represent unique domain knowledge for evaluating the end user experience. Other types of evaluation directives are contemplated and fall within the broader aspects of this disclosure.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A method for evaluating service quality of a software application residing in a computing environment, comprising:
    executing a service quality evaluator on a computer processor;
    determining, by the service quality evaluator, a first numeric value indicating a state of service for a system component by monitoring a metric associated with the system component and evaluating the metric associated with the system component in accordance with a first evaluation directive, where performance of the software application depends on the system component;
    comparing, by the service quality evaluator, the first numeric value to a threshold;
    determining, by the service quality evaluator, a second numeric value indicating a state of service for the software application by monitoring a metric associated with the software application and evaluating the metric associated with the software application in accordance with a second evaluation directive;
    multiplying, by the service quality evaluator, the second numeric value by a first weighting factor when the first numeric value exceeds the threshold; and
    multiplying, by the service quality evaluator, the second numeric value by a second weighting factor when the first numeric value is less than the threshold.

2. The method of claim 1 further comprises
    determining a third numeric value indicating a state of service for the software application in accordance with a third evaluation directive;
    multiplying the third numeric value by the second weighting factor when the first numeric value exceeds the threshold; and
    multiplying the third numeric value by the first weighting factor when the first numeric value is less than the threshold.

3. The method of claim 2 further comprises aggregating the weighted second numeric value with the weighted third numeric value.

4. A method for evaluating service quality of a software application residing in a computing environment, comprising:
    executing a service quality evaluator on a computer processor;
    determining, by the service quality evaluator, a first numeric value indicating a state of service for a system component by monitoring a metric associated with the system component and evaluating the metric associated with the system component in accordance with a first evaluation directive, where performance of the software application depends on the system component;
    determining, by the service quality evaluator, a second numeric value indicating a state of service for the software application by monitoring a metric associated with the software application and evaluating the metric associated with the software application in accordance with a second evaluation directive;
    selecting, by the service quality evaluator, a value for a first weighting factor as a function of the first numeric value;
    weighting, by the service quality evaluator, the second numeric value by the first weighting factor;
    determining, by the service quality evaluator, a third numeric value indicating a state of service for the software application by monitoring a metric associated with the software application and evaluating the metric associated with the software application in accordance with a third evaluation directive;
    selecting, by the service quality evaluator, a value for a second weighting factor as a function of the first numeric value;
    weighting, by the service quality evaluator, the third numeric value by the second weighting factor; and
    assigning a state of service for the software application by aggregating the weighted second numeric value with the weighted third numeric value.

5. The method of claim 4 further comprises
    comparing, by the service quality evaluator, the first numeric value to a threshold; and
    assigning a value to the first and second weighting factors based on the comparison.

6. The method of claim 5 further comprises changing the value assigned to at least one of the first and second weighting factors in accordance with changes in the first numeric value.

7. The method of claim 4 wherein determining the second numeric value further includes monitoring multiple metrics indicative of the performance of the software application and evaluating each of the metrics in relation to a different evaluation criterion.

8. The method of claim 4 wherein assigning a state of service for the software application further comprises computing a weighted average.

* * * * *